US009733149B2

(12) United States Patent
Eberlein

(10) Patent No.: US 9,733,149 B2
(45) Date of Patent: Aug. 15, 2017

(54) METHOD AND DEVICE FOR DETERMINING AND/OR MONITORING THE AIR TIGHTNESS OF AN ENCLOSED ROOM

(71) Applicant: AMRONA AG, Zug (CH)

(72) Inventor: Anselm Eberlein, Hannover (DE)

(73) Assignee: AMRONA AG, Zug (CH)

( * ) Notice: Subject to any disclaimer, the term of this patent is extended or adjusted under 35 U.S.C. 154(b) by 170 days.

(21) Appl. No.: 14/433,247

(22) PCT Filed: Sep. 3, 2013

(86) PCT No.: PCT/EP2013/068128
§ 371 (c)(1),
(2) Date: Jul. 28, 2015

(87) PCT Pub. No.: WO2014/067694
PCT Pub. Date: May 8, 2014

(65) Prior Publication Data
US 2015/0323411 A1 Nov. 12, 2015

(30) Foreign Application Priority Data
Oct. 29, 2012 (EP) .................................... 12190439

(51) Int. Cl.
*G01M 3/26* (2006.01)
*G01M 3/32* (2006.01)
(Continued)

(52) U.S. Cl.
CPC ........... *G01M 3/26* (2013.01); *A62C 99/0018* (2013.01); *B01D 53/047* (2013.01);
(Continued)

(58) Field of Classification Search
CPC ........ G01M 3/26; G01M 3/32; G01M 3/3263; A62C 99/00; A62C 35/00; A62C 13/00;
(Continued)

(56) References Cited

U.S. PATENT DOCUMENTS

| 5,128,881 A * | 7/1992 | Saum ..................... A62C 37/50 |
| | | 700/282 |
| 2008/0092633 A1* | 4/2008 | Wagner ................. G01M 3/226 |
| | | 73/40.7 |

(Continued)

FOREIGN PATENT DOCUMENTS

| DE | 3933265 A1 * | 4/1991 | ............. G01M 3/32 |
| DE | 102005023101 | 12/2006 | |

(Continued)

OTHER PUBLICATIONS

Translation of PCT Written Opinion of the International Searching Authority, dated Sep. 14, 2013.

*Primary Examiner* — Nguyen Ha
(74) *Attorney, Agent, or Firm* — Cesari and McKenna, LLP

(57) ABSTRACT

The invention relates to a method for determining and/or monitoring the air tightness of an enclosed room (2) which is equipped with an oxygen reducing system (1) and in the atmosphere of which at least one oxygen content that can preferably be determined in advance and is reduced in comparison to the normal surrounding air can be set and maintained in order to prevent and/or extinguish fires by introducing an oxygen-displacing gas. The oxygen reducing system (1) has a compressor system (4; 4.1, 4.2) for compressing an initial gas mixture and a gas separation system (3; 3.1, 3.2) downstream of the compressor system (4; 4.1, 4.2) for separating at least one part of the oxygen contained in the initial gas mixture and for providing a nitrogen-enriched gas which is supplied to the enclosed room (2). The differential pressure set in the room (2) is ascertained and compared to a corresponding reference value, whereby information regarding the air tightness of the room (2) is provided.

16 Claims, 3 Drawing Sheets

Figure 1:
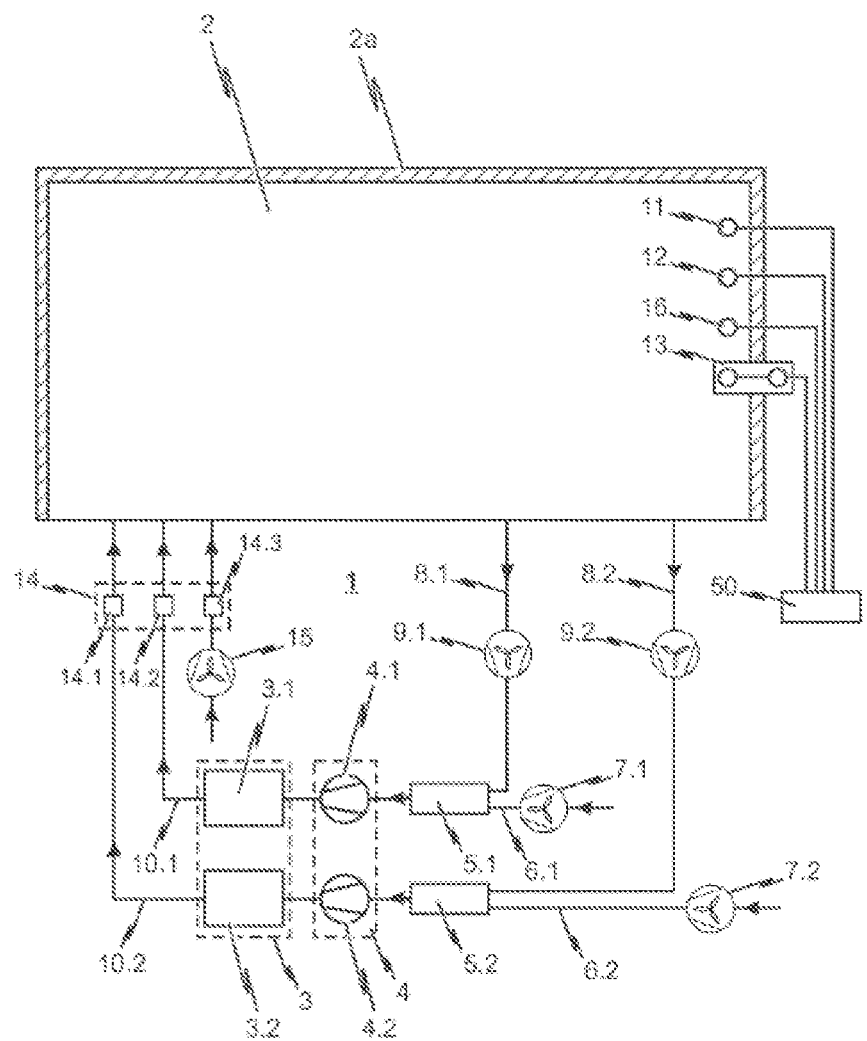

(51) Int. Cl.
    *A62C 99/00*     (2010.01)
    *B01D 53/047*     (2006.01)
    *B01D 53/22*     (2006.01)

(52) U.S. Cl.
    CPC ......... *B01D 53/0476* (2013.01); *B01D 53/22* (2013.01); *G01M 3/3263* (2013.01); *B01D 2256/10* (2013.01); *B01D 2257/104* (2013.01); *B01D 2259/4508* (2013.01)

(58) Field of Classification Search
    CPC ...... A62C 3/00; A62C 99/0018; B01D 53/22; B01D 53/0476; B01D 53/047; B01D 2257/104; B01D 2256/10; B01D 2259/4508
    See application file for complete search history.

(56) References Cited

U.S. PATENT DOCUMENTS

| | | | |
|---|---|---|---|
| 2008/0135265 A1 | | 6/2008 | Wagner et al. |
| 2008/0156506 A1 | | 7/2008 | Wagner et al. |
| 2011/0186312 A1 | * | 8/2011 | Gatsonides ............... A62C 3/07 169/46 |
| 2012/0145417 A1 | | 6/2012 | Anselm et al. |
| 2013/0312984 A1 | * | 11/2013 | Piegari ..................... A62C 2/00 169/45 |

FOREIGN PATENT DOCUMENTS

| | | | | |
|---|---|---|---|---|
| FR | 2509839 A1 | * | 1/1983 | ............ F17C 13/126 |
| FR | 2834066 A1 | * | 6/2003 | ............ G01M 3/226 |

\* cited by examiner

METHOD AND DEVICE FOR DETERMINING AND/OR MONITORING THE AIR TIGHTNESS OF AN ENCLOSED ROOM

CROSS-REFERENCE TO RELATED APPLICATIONS

The present application claims the benefit of the following commonly assigned International Application No. PCT/EP2013/068128, which was filed on Sep. 3, 2013 which claims the benefit of European Application No. 12190439.5 which was filed on Oct. 29, 2012, and is hereby incorporated by reference.

FIELD OF THE INVENTION

The invention relates to a method for determining and/or monitoring the airtightness of an enclosed room equipped with an oxygen reducing system. In particular, the invention relates to a method for determining and/or monitoring as precisely as possible the relevant volume-related leakage flow for rooms able to be rendered inert, and particularly rendered continuously inert, in which an inerting method is used.

The invention further relates to an oxygen reducing system for setting and maintaining an oxygen content which is predefinable and reduced in comparison to the normal ambient air in the spatial atmosphere of an enclosed room, wherein the oxygen reducing system is designed to realize the inventive method for determining and/or monitoring the airtightness of the enclosed room.

BACKGROUND OF THE INVENTION

Inerting methods for high altitude training, storing food or for minimizing the risk of fire in an enclosed room are generally known from inertization technology. In such inerting methods, the atmosphere of the enclosed room is usually lowered to and then maintained at an inerting level below the oxygen concentration of the ambient air atmosphere by the introduction of an oxygen-displacing gas from an inert gas source.

The preventative effect resulting from this method is based on the principle of oxygen displacement. As is known, normal ambient air consists of approximately 21% oxygen by volume, 78% nitrogen by volume and 1% by volume of other gases. In order to minimize the risk of a fire breaking out or respectively to extinguish a fire that has already broken out in an enclosed room, or to extend the shelf life of stored food, the concentration of nitrogen in the respective room is increased, and the oxygen content thus reduced, for example by introducing pure nitrogen as inert gas. An appreciable protective effect and/or fire prevention effect is known to begin once the percentage of oxygen drops below about 15% by volume. Depending upon the flammable materials (fire load) within the relevant room, it may be necessary to further lower the oxygen content to, for example, 12% by volume. Most combustible materials can no longer ignite or burn at such an oxygen concentration.

An oxygen reducing system is generally configured such that one or more defined drawdown levels can be set in the spatial atmosphere of an enclosed room within a specific amount of time and maintained for a defined period or continuously. It is thus for example necessary to rapidly reduce the oxygen content in the room's atmosphere in the event of fire so as to extinguish (quench) the fire and effectively prevent re-igniting of the material in the room at least for the duration of a so-called reignition phase.

The reignition phase noted above indicates the period of time following the so-called "firefighting phase" during which the oxygen concentration in the enclosed room is not allowed to exceed a specific value, the so-called "reignition prevention value phase," so as to prevent the material in the protected area from reigniting. The reignition prevention level is thereby an oxygen concentration contingent upon the fire load of the room and determined by testing.

In order to be able to ensure fire prevention and/or long shelf life of stored food, the oxygen reducing system needs to be configured accordingly; i.e. it needs to be able to supply a specific volumetric flow of oxygen-displacing gases for a longer period of time. The amount of oxygen-displacing gases to be supplied per unit of time by the oxygen reducing system in an individual case depends in particular on the spatial volume and the airtightness of the enclosed room. The oxygen reducing system thus needs to have a larger capacity when the enclosed room is for example a stockroom of relatively large spatial volume since a greater volume of oxygen-displacing gases is introduced into the spatial atmosphere of the stockroom per unit of time—compared to a relatively small protected area—so as to be able to set a drawdown level within a specified period of time. On the other hand, the amount of oxygen-displacing gases supplied by the oxygen reducing system also increases per unit of time the lower the airtightness of the enclosed room is, or the higher the air exchange rate is respectively.

The influence of the spatial volume generally poses no difficulties to the configuring of an oxygen reducing system. This is due to the fact of it being relatively easy to determine the maximum spatial volume of a room equipped or to be equipped with an oxygen reducing system to be factored in and at least this spatial volume being unable to increase over time. However, it is a different matter with respect to the airtightness of the room. The air exchange rate, expressed as the so-called n50 value, is usually used as the measure of a room's airtightness.

The n50 air exchange rate is derived from the volumetric air flow per hour, when a pressure differential of 50 Pa is to be maintained, divided by the volume of the structure. Hence, the enclosed room has a higher airtightness value the lower the air exchange rate is.

A differential pressure measuring procedure (blower-door method) is usually used to measure the n50 value being a measure of a room's airtightness. However, performing a series of differential pressure measurements to determine the n50 air exchange rate is often coupled with various difficulties and requires a great deal of technical effort, particularly in larger buildings or spaces. Even when a differential pressure measurement identifies the n50 value of the respective space, this does not rule out the enclosed room's state changing over time, particularly its air exchange rate. It is thus for example conceivable for initially sealed openings in the room to become untight. Also placing objects and/or goods into the enclosed room (particularly in the case of a stockroom) impacts the air exchange rate determined by the differential pressure measurement.

The fact that the airtightness of an enclosed room not only can change over time but can also in particular worsen poses a problem when configuring oxygen reducing systems. In particular, it has not been possible to date, or only possible with great effort, to determine the airtightness of a room already equipped with an oxygen reducing system at a later point in time in order to adapt the capacity of the oxygen reducing system as needed; i.e. for example to increase the volume of oxygen-displacing gases the oxygen reducing system supplies per unit of time so as to still provide fire prevention and/or long shelf life after a decrease in the airtightness of the enclosed room.

Continuous monitoring of the airtightness of a space equipped with an oxygen reducing system is also desirable to the extent of the conclusions which might also be drawn to neighboring spaces with respect to leakages which have newly arisen. The risk in this is that oxygen-displacing gases may end up in the neighboring spaces through such newly developed leakages, which in certain circumstances might result in endangering the health of people within the neighboring spaces.

SUMMARY

Based on this problem as set forth, the present invention addresses the objective of specifying a method with which the airtightness of an enclosed room can be determined as precisely as possible and without a great deal of effort, respectively an initially determined airtightness value can be controlled/verified at a later point in time, whereby said room is to be particularly suited for the use of the above-described inertization technology.

In particular, a method and a system are to be specified with which the current airtightness of the enclosed room can be determined/controlled at any time needed in an effective yet readily realizable manner without the need for performing a time-consuming series of measurements such as is the case for example with the known prior art blower-door measuring procedure for determining the n50 value.

This objective is accomplished by the subject matter of independent claim 1 with respect to the method and by the subject matter of further independent claim 14 with respect to the system.

Advantageous further developments of the inventive method are set forth in dependent claims 2 to 13.

DESCRIPTION

Accordingly, particularly specified is a method for determining and/or monitoring the airtightness of an enclosed room equipped with an oxygen reducing system, wherein at least one preferably predefinable oxygen level which is reduced in comparison to the normal ambient air can be set and maintained in the spatial atmosphere of the enclosed room by introducing an oxygen-displacing gas. The oxygen reducing system associated with the enclosed room has a compressor system for compressing an initial gas mixture containing at least nitrogen and oxygen and a gas separation system downstream of the compressor system in which at least a portion of the oxygen contained in the initial gas mixture is separated such that a nitrogen-enriched gas is provided at the outlet of the gas separation system. This nitrogen-enriched gas is supplied to the enclosed room to set and/or maintain a reduced oxygen level. At the same time, the pressure prevailing or set in the enclosed room in relation to the ambient air pressure is determined. The pressure difference determined is used as a measure of the airtightness of the enclosed room. During the determination, variable room openings such as for example windows or doors, etc., advantageously have no avoidable influence so as not to falsify the measurement result.

Subsequently in the inventive method, the at least one previously determined differential pressure value is compared to a corresponding reference value (target value). Evaluation of the acquired comparison result follows thereafter, whereby depending on the amount of deviation between the determined differential pressure value and the respective reference value, an assumption can be made as to the airtightness of the enclosed room and/or the airtightness of the enclosed room over time.

The advantages achievable with the inventive solution are obvious: Because the system can make use of the components of the already existing oxygen reducing system in determining and/or monitoring the airtightness of the enclosed room, the airtightness of the enclosed room can be determined/controlled at any time in a readily realizable yet effective manner. All that is required hereto is the providing of a nitrogen-enriched gas using the compressor and gas separation system of the oxygen reducing system, same preferably being introduced continuously and at a constant flow rate into the enclosed space, in order to establish a pressure difference in the enclosed room compared to the external pressure (ambient pressure). The compressor system is preferably regulated such that there is a temporally constant volumetric flow of nitrogen-enriched gas at the outlet of the gas separation system so that a certain pressure difference in relation to the external pressure is established when the supplied gas is introduced into the enclosed room. This pressure difference together with the volumetric flow introduced into the enclosed room provides a measure of the enclosed room's airtightness. It thus constitutes an easily realizable variant of the known "blower-door test" differential pressure procedure.

To be emphasized here is that the method according to the invention can determine the airtightness of the enclosed room without a lot of time and effort. The method is thus particularly suitable for checking whether leakages which had not previously been recognized may have newly formed in the spatial shell of the room over time, this having an influence on the air exchange rate of the room. It is thus for example conceivable to use the inventive method weekly to measure the room's airtightness and compare it to a predefined or specified reference value. If it turns out that additional leakages have appeared in the spatial shell of the enclosed room, appropriate measures will need to be taken. These might for example consist of inspecting the room's shell for leakages in order to seal them accordingly. Additionally or alternatively hereto, it is however also conceivable to adapt the oxygen reducing system to the higher air exchange rate of the protected room. This could in particular involve the quantity of inert gas the oxygen reducing system is to quickly supply in the event of fire.

One preferential further development of the inventive method provides for not only introducing gas supplied at the outlet of the gas separation system when determining and/or monitoring the airtightness of the enclosed room but also additionally introducing fresh air into the enclosed room in order to increase the total volumetric flow introduced into the enclosed room. Doing so achieves a higher specific differential pressure developing in the enclosed room compared to the ambient air pressure (external atmosphere). In this variation—compared to a case where only the gas supplied at the outlet of the gas separation system is introduced—the airtightness of the room is more precisely determined from the higher differential pressure. Smaller changes in the airtightness can thus be reliably detected. Using a ventilation system component of the oxygen reducing system and/or the compressor system component of the oxygen reducing system is hereby expedient for introducing the additional fresh air into the enclosed room such that also in this further development, the system can draw on the already existing components of the oxygen reducing system.

Since a reliable assessment of the enclosed room's airtightness can only be made when the volume of gas supplied to the enclosed room per unit of time is constant, at least following a certain start-up time, it is preferential for the nitrogen-enriched gas supplied at the outlet of the gas separation system and the additionally supplied fresh air as applicable to be introduced into the enclosed room preferably continuously at a constant volumetric flow rate.

Practical experiments have shown that it is advantageous in terms of the measuring period and the measuring accuracy for the relative volumetric flow rate Qrel; i.e. the volumetric flow in relation to the spatial volume of the room and to the air exchange rate n50 (Qrel=volumetric flow/(spatial volumexair exchange rate)) to assume a value between 0.2 and 0.9 so that a relative change in the n50 value of from 50% to 3% can be recognized. At a spatial volume of 600,000 m$^3$ and an n50 value of 0.015/h, the volumetric flow rate should assume a preferably constant value within a range of 1800 m$^3$/h to 8100 m$^3$/h. It is even more preferential for the relative volumetric flow rate Qrel to be between 0.34 and 0.67 which, at a spatial volume of 600,000 m$^3$ and an n50 value of 0.015/h, corresponds to a flow of 3000 m$^3$/h to 6000 m$^3$/h and a detectable n50 value change of between 17% and 5%. These flow rates are easily realizable with the components of a conventional oxygen reducing system.

The differential pressure measurement of the inventive method preferably occurs concurrently, or at least partially overlaps temporally, with the gas being introduced into the enclosed room. The evaluation preferably draws on differential pressure values taken once a constant volumetric flow rate Q has been reached. In order to reduce measurement errors, it is even more preferential for the evaluation to only draw on those differential pressure values taken after the difference in pressure has been reached in the enclosed room and no longer changes for a specific period of time or, respectively, does not exceed or fall short of a predefinable tolerance range.

Specifically, evaluation with the inventive method occurs by comparing at least one determined differential pressure value to a corresponding reference value. The term "differential pressure" or "differential pressure value" as used herein is to be understood as a pressure set in relation to the ambient air pressure by gas being introduced into the enclosed room.

The pressure value used in the comparison advantageously corresponds numerically to a differential pressure set in the enclosed room—relative to the ambient air pressure—upon a continuous supply of gas at a constant flow rate Q. Using a pressure measuring system, particularly a differential pressure measuring system, hereby lends itself to detecting the pressure value used in the evaluation.

To simplify the evaluation and increase the measuring accuracy, it is advantageous for the detected pressure value which is to be compared to the corresponding reference value to be measured at a point in time at which, given the continuous supply of gas at a constant volumetric flow rate Q, the temporal change in pressure in the enclosed room does not exceed a predefined or definable upper threshold nor fall short of a predefined or definable lower threshold.

Alternatively or additionally hereto, it is conceivable for the pressure value used in the evaluation to correspond to a mean value of a plurality of pressures detected by a pressure measuring system, particularly a differential pressure measuring system.

Since the temperature of the ambient air in the room also has an impact on the pressure prevailing or set within the room, it is of further advantage in terms of reducing measurement errors to preferably continuously or at predefined times or upon predefined events, detect, and in particular measure, the temperature in the enclosed room. The detected temperature value is preferably taken into account when determining the at least one pressure value used in the evaluation.

Lastly, one advantageous realization of the inventive method provides for the automatic and preferably selectively automatic issuing of a warning message when the evaluation shows that the determined pressure value deviates from the reference value by more than a predefinable tolerance.

The term "reference value" as used herein is to be understood as a specific predefinable pressure value which is set in the enclosed room upon a specific volumetric flow Q. This reference value can for example be determined when the oxygen reducing system is placed into operation for the first time. It is however also conceivable for the reference value to continuously change. It is hereby conceivable to use for example the differential pressure value of an earlier measurement as the reference value.

The invention further relates to an oxygen reducing system for fire prevention and/or fire extinguishing designed to realize the method according to the invention. To this end, the oxygen reducing system has a compressor system for compressing an initial gas mixture containing at least nitrogen and oxygen and a gas separation system downstream of the compressor system in which at least a portion of the oxygen contained in the initial gas mixture is separated during its operation such that a nitrogen-enriched gas is provided at the outlet of the gas separation system. The nitrogen-enriched gas can be introduced into the enclosed room through a system of pipes in order to effect a corresponding pressure buildup in the room when the inventive method is implemented. The oxygen reducing system according to the invention is preferably further equipped with a pressure measuring system, particularly a differential pressure measuring system, in order to determine the set pressure within the enclosed room compared to the ambient air pressure.

Additionally to the compressor system, the inventive oxygen reducing system preferably also comprises a fresh air ventilator system with which fresh air can be introduced into the spatial atmosphere of the enclosed room.

It is generally advantageous for a volumetric flow measuring system to be provided to continuously, or at predefined times or upon predefined events, determine the volume of gas the oxygen reducing system supplies to the enclosed room per unit of time.

The following will make reference to the accompanying drawings in describing advantageous embodiments of the invention.

Figure 2:
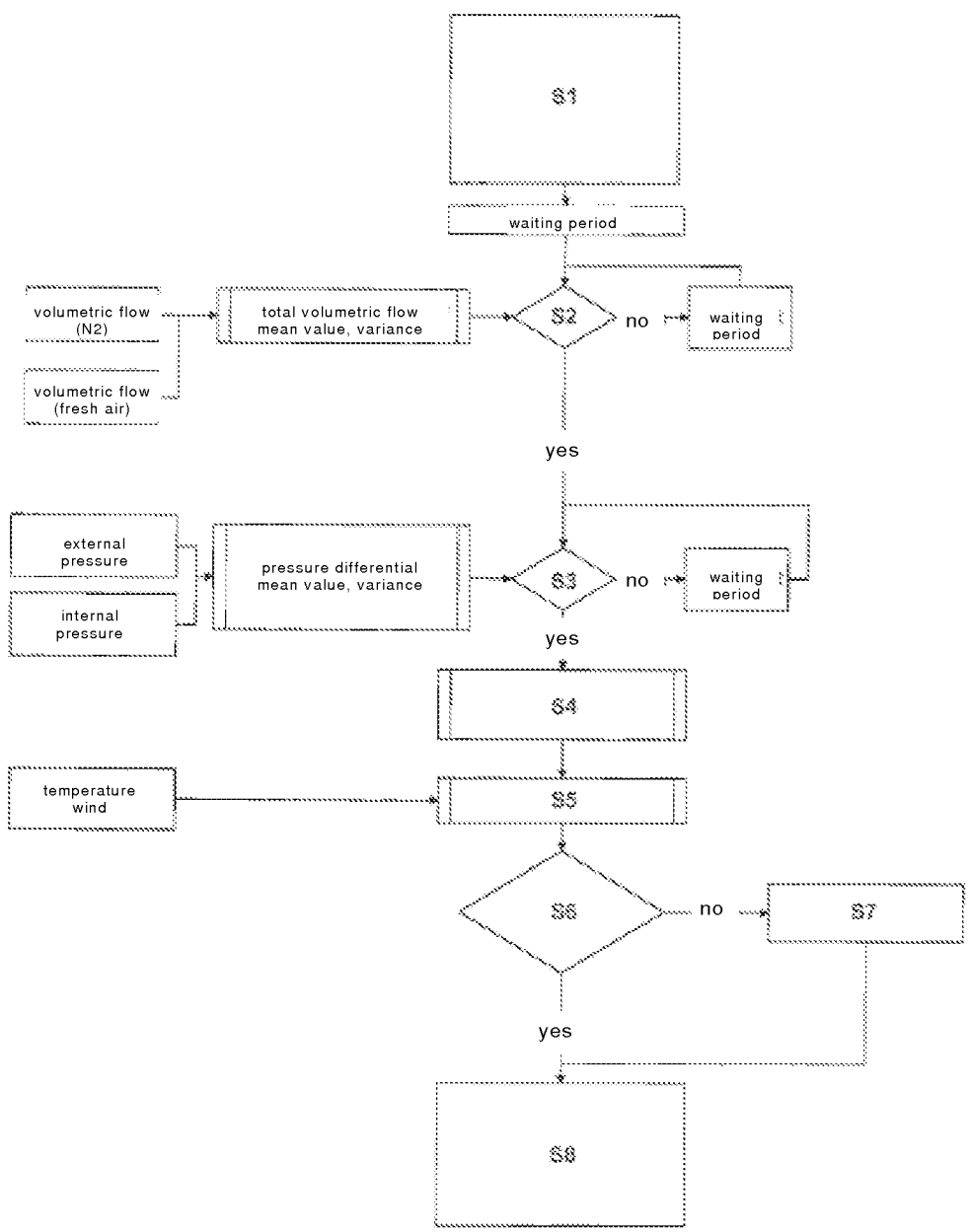
Figure 3:
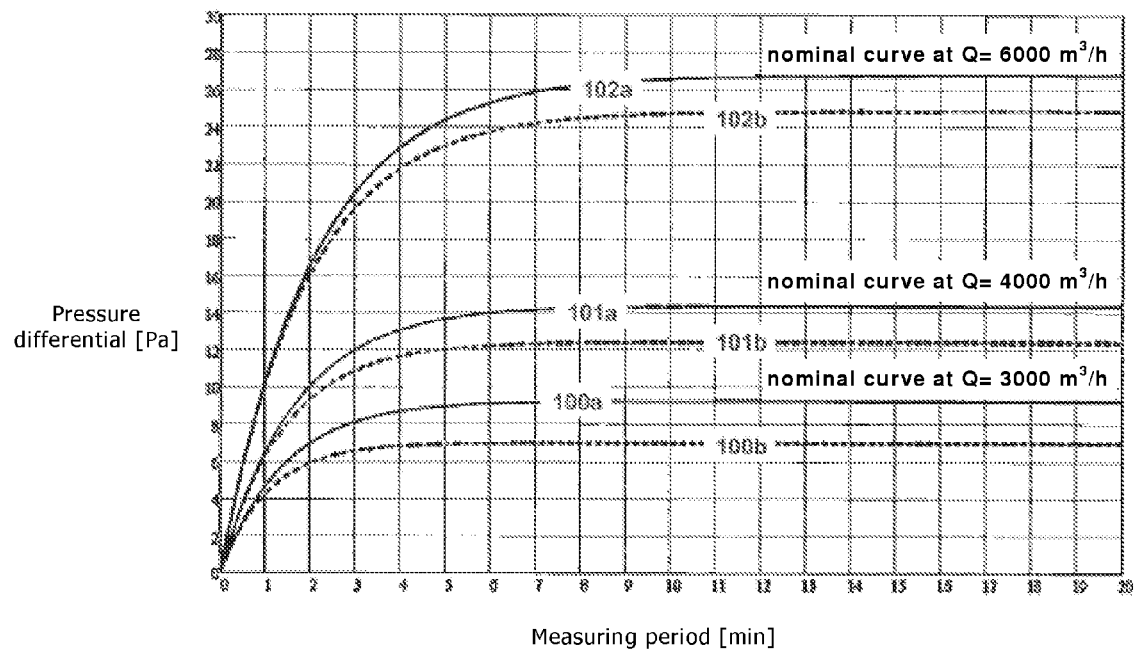

Shown are:

FIG. 1 a schematic view of an exemplary embodiment of the oxygen reducing system according to the invention;

FIG. 2 a flowchart illustrating an exemplary embodiment of the method according to the invention; and FIG. 3 a graphic depiction of the pressure gradient in an enclosed room upon the introduction of gas at different flow rates at respectively two different room air exchange rates.

FIG. 1 shows a schematic depiction of an exemplary embodiment of an oxygen reducing system 1 according to the present invention. The oxygen reducing system 1 is associated with an enclosed room 2 (also referred to as "protected room") and serves to set and maintain as needed a predefinable inerting level in the spatial atmosphere of the enclosed room 2. The enclosed room 2 can for example be a stockroom in which the oxygen content in the atmosphere of the room is lowered to and maintained at a specific inerting level of for example 15% by volume or less as a preventive measure against fire.

The inventive oxygen reducing system is not, however, designed solely to protect against fire preventively but rather can also be designed so as to lower the oxygen content in the spatial atmosphere of the enclosed room 2 should a fire break out in the enclosed room 2.

The enclosed room 2 is automatically, and preferably selectively automatically, rendered inert by a control means 50. To this end, the oxygen reducing system 1 according to the exemplary embodiment depicted in FIG. 1 comprises a gas separation system 3 and a compressor system 4.

The compressor system 4 in the embodiment depicted as an example in FIG. 1 is composed of a PSA or VPSA nitrogen generator 3.1 and a membrane nitrogen generator 3.2. Specifically, the nitrogen generator 3.1 based on PSA/VPSA technology comprises at least one adsorber vessel containing adsorber material designed to adsorb oxygen molecules when a gas containing oxygen passes through the adsorber vessel.

The nitrogen generator 3.2 based on membrane technology uses a membrane system which capitalizes on the fact of different gases diffusing at different rates through certain materials. It is hereby conceivable to use a hollow fiber membrane with a separation material applied to the outer surface of the hollow fiber membrane through which oxygen can diffuse quite well whereas nitrogen only exhibits a low diffusion rate with this separation material. When air flows through the inside of a hollow fiber membrane prepared in this way, the oxygen contained in the air quickly diffuses outward through the hollow fiber wall while the nitrogen largely remains within the interior of the fiber so that a concentration of nitrogen occurs upon passage through the hollow fiber.

Although the schematic representation according to FIG. 1 only depicts one respective PSA/VPSA-based nitrogen generator 3.1 and one respective membrane-based nitrogen generator 3.2, using a plurality of parallel-connected nitrogen generators based on the same principle of operation is of course also conceivable.

The compressor system 4 according to the embodiment depicted as an example in FIG. 1 comprises a first compressor 4.1 associated with the PSA/VPSA nitrogen generator 3.1 as well as a second compressor 4.2 associated with the membrane nitrogen generator 3.2. Both compressors 4.1, 4.2 serve to provide a compressed initial gas mixture at the inlet of the respective nitrogen generator 3.1, 3.2. To this end, the respective discharge-side outlets of the compressors 4.1, 4.2 are fluidly connected or connectable to the respective inlets of the associated nitrogen generators 3.1, 3.2.

Each nitrogen generator 3.1, 3.2 is associated with an upstream mixing chamber 5.1, 5.2 in which the initial gas mixture which the corresponding compressor 4.1, 4.2 supplies to the respective nitrogen generator 3.1, 3.2 is provided.

To be generally understood by the term "initial gas mixture" as used herein is a mixture of gas consisting of nitrogen, oxygen and other elements as applicable. The initial gas mixture can in particular be fresh air; i.e. air from the outer atmosphere, which is known to consist of 21% oxygen by volume, 78% nitrogen by volume and 1% by volume of other gases, particularly noble gases. To this end, each mixing chamber 5.1, 5.2 is provided with a corresponding fresh air feed line 6.1, 6.2 through which fresh air can be supplied to the mixing chamber 5.1, 5.2 as needed by means of a fresh air fan 7.1, 7.2.

In order to increase the efficiency of the gas separation system 3 used in the inventive oxygen reducing system 1, recirculation is also provided in the exemplary embodiment depicted in FIG. 1. The recirculation serves to extract a portion of the ambient air from the atmosphere of the enclosed room 2 as needed and feed said portion to the respective mixing chamber 5.1, 5.2 in which the extracted portion of the room's air is mixed with the fresh air supplied by the respective fresh air feed line 6.1, 6.2. The initial gas mixture is then a mixture of fresh air and room air having as applicable a reduced oxygen content compared to the fresh air.

In order to enable the recirculation of the room's ambient air, corresponding recirculation lines 8.1, 8.2 are provided in the embodiment of the inventive oxygen reducing system 1 depicted schematically in FIG. 1, by means of which a portion of the enclosed room's ambient air can be extracted as needed, for example by means of a recirculation fan 9.1, 9.2. Specifically, in the embodiment of the inventive oxygen reducing system 1 depicted as an example, one recirculation fan 9.1, 9.2 each is provided for both the PSA/VPSA nitrogen generator 3.1 as well as the membrane nitrogen generator 3.2. Each of the two recirculation fans 9.1, 9.2 is fluidly connected or connectable at its suction-side inlet to the interior of the enclosed room 2 by means of one of the recirculation lines 8.1, 8.2. The discharge-side outlet of each of the recirculation fans 9.1, 9.2 is fluidly connected or connectable to the respective mixing chamber 5.1, 5.2 of the associated nitrogen generator 3.1, 3.2.

In order to use the oxygen reducing system 1 to reduce the oxygen content in the spatial atmosphere of the enclosed room 2 compared to the oxygen content of the ambient air (21% by volume) and thus set a corresponding drawdown or inerting level, the initial gas mixture provided in the first mixing chamber 5.1 is compressed by the first compressor system 4.1 and fed to the PSA/VPSA nitrogen generator 3.1 in which at least a portion of the oxygen contained within the initial gas mixture is separated so that a nitrogen-enriched gas mixture is made available at the outlet of the PSA/VPSA nitrogen generator 3.1. This nitrogen-enriched gas mixture is then supplied to the spatial atmosphere of the enclosed room through a supply line system 10.1.

Additionally or alternatively hereto, the initial gas mixture provided in the second mixing chamber 5.2 is compressed by the second compressor 4.2 and fed to the membrane nitrogen generator 3.2 so that a nitrogen-enriched gas mixture is likewise made available at the outlet of the membrane nitrogen generator 3.2 which is supplied to the spatial atmosphere of the enclosed room through a second supply line system 10.2.

In the normal operating mode of the oxygen reducing system 1; i.e. in an operating mode in which preventive protection against fire or firefighting is provided by the oxygen reducing system 1, a mixture of fresh air and room air is used as the initial gas mixture for the purpose of optimizing the efficiency of the gas separation system 3. To this end, both mixing chambers 5.1, 5.2 are fluidly connected to the interior of the enclosed room 2 by the respective recirculation fans 9.1, 9.2 and the associated recirculation lines 8.1, 8.2. At the same time, fresh air is supplied in regulated manner to the associated mixing chambers 5.1, 5.2 by the respective fresh air fans 7.1, 7.2.

The exemplary embodiment of the inventive oxygen reducing system 1 depicted schematically in FIG. 1 is further provided with a control means 50 with which the corresponding controllable components of the oxygen reducing system can preferably be automatically, and even more preferably selectively automatically, controlled. For this purpose, the oxygen reducing system 1 comprises an oxygen measuring system 11 with which the oxygen content in the spatial atmosphere of the enclosed room 2 can be detected continuously or at predefined or predefinable times and/or upon specific events. Depending on the detected oxygen content, the control means 50 controls the gas separation system 3 and/or the compressor system 4 and/or the corresponding fresh air fans 7.1, 7.2 or recirculation fans 9.1, 9.2 respectively such that a predefinable drawdown level can be set and/or maintained in the spatial atmosphere of the enclosed room.

The oxygen reducing system 1 preferably further comprises particularly an aspirative fire detection system which preferably continuously monitors the spatial atmosphere of the enclosed room 2 for the presence of fire characteristics. In the event of a fire, the fire detection system 12 emits a corresponding alarm to the control means 50 which initiates the lowering of the oxygen content in the spatial atmosphere of the enclosed room 2 to a full inerting level. "Full inerting level" in this context means reducing the oxygen content in the spatial atmosphere of the enclosed room 2 far enough that the materials (fire load) in the enclosed room are no longer flammable. The full inerting level generally ranges from 12% to 14% of oxygen concentration by volume.

The inventive oxygen reducing system 1 is not only suited to introducing an oxygen-displacing gas (inert gas) into the spatial atmosphere of the enclosed room 2 for the purpose of preventive fire protection and/or for the purpose of extinguishing fire such that a reduced oxygen level can be set and maintained in the spatial atmosphere compared to the normal ambient air, it is also suited to determining and/or monitoring the airtightness of the enclosed room 2. A differential pressure measuring system 13 able to determine a difference between the pressure prevailing within the enclosed room 2 (internal pressure) and the external pressure is thereby provided to enable this additional functionality. A volumetric flow measuring system 14 is further used in the exemplary embodiment of the inventive oxygen reducing system 1 depicted schematically in FIG. 1 with which the total volume of gas introduced into the enclosed room per unit of time can be measured continuously or at predefined or predefinable times and/or upon specific events.

In detail, the volumetric flow measuring system 14 depicted as an example in FIG. 1 comprises two corresponding volumetric flow sensors 14.1, 14.2, whereby one respective volumetric flow sensor 14.1, 14.2 each is arranged in one of the two supply line systems 10.1, 10.2.

The following will reference the flowchart shown in FIG. 2 in describing an exemplary embodiment of the inventive method for determining and/or monitoring the airtightness of an enclosed room 2. The method is particularly realizable with the exemplary embodiment of the inventive oxygen reducing system 1 depicted in FIG. 1, whereby the control means 50 has a corresponding sequence control and/or evaluation logics for this purpose.

When the airtightness of the enclosed room 2 is to be determined, the respective initial values are set in a first method step (step S1). This means in particular that the recirculation of room air to the corresponding mixing chambers 5.1, 5.2 is stopped by switching off the recirculation fans 9.1, 9.2 and/or interrupting the fluidic connection between the mixing chambers 5.1, 5.2 and the enclosed room 2. In other words, during the airtightness monitoring mode of the oxygen reducing system 1, the respective mixing chambers 5.1, 5.2 are only connected to the respective fresh air fans 7.1, 7.2 at the input side so that pure fresh air is used as the initial gas mixture.

Additionally to the supply of fresh air as the initial gas mixture provided by means of fresh air fans 7.1, 7.2, it can also be provided for the recirculation fans 9.1, 9.2 to be correspondingly switched by means of valves (not shown in FIG. 1) in order to support the fresh air fans 7.1, 7.2 and likewise supply fresh air to the enclosed room 2 as the initial gas mixture. In other words, it is thus also possible to divert the recirculation fans 9.1, 9.2 on the inlet side so as to support the fresh air fans 7.1, 7.2 in the measurement (not depicted in FIG. 1).

The compressor system 4 is furthermore switched on in method step S1, and specifically preferably both compressors 4.1,4.2 of the compressor system 4, so that both the PSA/VPSA nitrogen generator 3.1 as well as the membrane nitrogen generator 3.2 provide compressed fresh air as the initial gas mixture. A gas separation takes places in the nitrogen generators 3.1, 3.2. The nitrogen-enriched gas provided at the respective outlets of the nitrogen generators 3.1, 3.2 is fed to the enclosed room 2 via the corresponding supply line systems 10.1, 10.2.

In order to further increase the volume of gas supplied to the enclosed room 2 per unit of time, it is advantageous for not only the compressor system 4 (here: preferably both compressors 4.1, 4.2) to be switched on in the airtightness monitoring mode of the oxygen reducing system 1 but preferably also both fresh air fans 7.1, 7.2.

Also further conceivable hereby is additionally supplying pure fresh air to the enclosed room 2 when the oxygen reducing system 1—as schematically depicted in FIG. 1—is equipped with a corresponding additional fresh air ventilator system 15. In this case, the optionally providable fresh air ventilator system 15 should also be provided with a volumetric flow sensor 14.3 so as to be able to measure the amount of fresh air supplied to the enclosed room 2 per unit of time.

It is also further conceivable for the operation of the gas separation system 3 to be regulated so as to set a nitrogen purity consistent with or higher than the nitrogen concentration of the protected atmosphere for the gas separation system 3, and maintain same by regulating, for the purpose of determining and/or monitoring the airtightness of the enclosed room 2. It is thereby possible to increase the gas flow during determining and/or monitoring of the airtightness of the enclosed room 2 and if necessary reduce the pure fresh air to be supplied by the fresh air fans 7.1, 7.2 as the initial gas mixture.

The volumetric flow sensors 14.1, 14.2 and 14.3 preferably continuously measure the volume of gas supplied to the enclosed room per unit of time during the supply process. It thereby needs to be ensured that the control means 50 controls the compressors 4.1, 4.2 utilized and the likewise utilized fresh air fans 7.1, 7.2, or the optionally utilized fresh air ventilator system 15 respectively, so as to ensure a continuous supply of gas at a constant volumetric flow rate Q. To this end, the exemplary embodiment of the inventive method depicted in the FIG. 2 flowchart performs a check in method step S2 after a certain waiting period of preferably a few minutes as to whether the gas is being supplied to the enclosed room 2 at a constant volumetric flow rate Q and is continuous over time.

If it is determined in step S2 that the variance of the measured flow rate values detected by the volumetric flow measuring system 14 exceeds a predefined tolerance, another check will follow after a certain waiting period of for example one minute as to whether the gas is then being supplied to the enclosed room 2 at a constant volumetric flow rate Q. This S2 method step query is repeated until the variance of the volumetric flow is within the predefined tolerance.

When it is determined in step S2 that gas is being supplied to the enclosed room 2 continuously and at a constant volumetric flow rate Q, the differential pressure measurement by means of differential pressure measuring system 13 then follows in method step S3. A mean value and the variance of a plurality of pressure values detected by the differential pressure measuring system 13 is preferably determined in method step S3. If it is thereby indicated that the variance exceeds a predefined tolerance, another series of differential pressure measurements will again be taken after a certain waiting period of for example one minute. This process is repeated until the differential pressure measurement value variance in method step S3 is within the predefined tolerance.

The volumetric flow measuring system 14 then measures the volumetric flow rate Q at which the gas is supplied to the enclosed room 2 in method step S4. An averaging of a plurality of volumetric flow rates detected by the volumetric flow measuring system 14 also preferably takes place in method step S4.

Subsequently, the temperature in the enclosed room 2 is measured by means of a temperature measuring system 16. The differential pressure measurement value determined in method step S3 is normalized in method step S5 factoring in the temperature as measured.

The normalized differential pressure is thereafter compared to a predefined and/or pre-taught reference value. If the comparison indicates that the normalized differential pressure detected differs from the reference value, an alarm is issued (step S7) when the deviation exceeds a predefined tolerance value. The alarm which occurs in step S7 is for example a warning message being issued as to an increased risk of leakage.

However, when the differential pressure detected and normalized in step S6 is within the preset tolerance range, the operating mode of the oxygen reducing system is reset from the airtightness monitoring mode to the fire prevention/extinguishing mode in step S8. The determined, normalized differential pressure is moreover stored in the control means 50.

Changing the operating mode of the oxygen reducing system relates in particular to the renewed activating of the recirculation of room air to the respective mixing chambers 5.1, 5.2 as well as the appropriate controlling of the compressors 4.1, 4.2 such that a predefinable or predefined reduced oxygen content is set and maintained in the spatial atmosphere of the enclosed room 2. The optionally provided fresh air ventilator system 15 is likewise switched back into normal operating mode.

FIG. 3 graphically depicts how in one implementation of the inventive solution, the pressure develops over time within an enclosed room 2 depending on different volumetric flow rates. Specifically, the measuring period in minutes [min] is plotted on the X-axis and the differential pressure in relation to the external pressure determined by the differential pressure measuring system 13 is plotted in pascal [Pa] on the Y-axis. The spatial volume of the enclosed room is 600,000 m$^3$.

The curve identified in FIG. 3 by reference numeral "100a" shows the pressurization in the enclosed room 2 at an incoming volumetric flow rate Q of 3000 m$^3$/h, whereby the airtightness of the enclosed room 2 corresponds to its initial value or target value respectively. At the incoming volumetric flow rate Q of 3000 m$^3$/h, this target value serves as the reference value.

The curve identified by reference numeral "100b" reflects a situation of there being additional leakages in the spatial shell 2a of the enclosed room 2 at an incoming volumetric flow rate Q of 3000 m$^3$/h such that the differential pressure in room 2 deviates from the reference value (curve 100a) which means that the airtightness of the enclosed room 2 no longer corresponds to its initial or target value (cf. curve 100a). The difference between curve 100a and curve 100b at the approximately 2 Pa magnitude of measurement uncertainty indicates that the overall airtightness of the room 2 has decreased by at least the relative change of the determinable n50 value and appropriate measures are to be taken.

Curves 101a, 101b and 102a, 102b show the corresponding pressurization at a 4000 m$^3$/h and 6000 m$^3$/h flow rate Q, respectively without additional leakages (cf. curves 101a, 102a) and with additional leakages (cf. curves 101b, 102b).

The invention is not limited to the embodiments depicted as examples in the drawings but rather yields from an integrated consideration of all the features disclosed herein.

It is in particular conceivable to also factor in the wind speed prevailing at the time when the normalized differential pressure is compared to a predefined and/or pre-taught reference value. The influence of wind speed on the pressure differential within the room could also be factored in beforehand, for example along with the compensation for temperature (step S5).

LIST OF REFERENCE NUMERALS 1 oxygen reducing system
2 enclosed room
2a spatial shell
3 gas separation system
3.1 PSA/VPSA nitrogen generator of the gas separation system
3.2 membrane nitrogen generator of the gas separation system
4 compressor system
4.1 first compressor of the compressor system
4.2 second compressor of the compressor system
5.1 first mixing chamber
5.2 second mixing chamber
6.1 first fresh air supply line
6.2 second fresh air supply line
7.1 first fresh air fan
7.2 second fresh air fan
8.1 first recirculation line
8.2 second recirculation line
9.1 first recirculation fan
9.2 second recirculation fan
10.1 first supply line system
10.2 second supply line system
11 oxygen measuring system
12 fire detection system
13 differential pressure measuring system
14 volumetric flow measuring system
14.1 first volumetric flow sensor of the volumetric flow measuring system
14.2 second volumetric flow sensor of the volumetric flow measuring system
14.3 third volumetric flow sensor of the volumetric flow measuring system
15 fresh air ventilator system
16 temperature measuring system
50 control means

What is claimed is:

1. A method for determining and/or monitoring airtightness of an enclosed room equipped with an oxygen reducing system, the method comprising:

i) providing fresh air from outside of the enclosed room as an initial gas mixture;
ii) compressing the provided fresh air in a compressor system of the oxygen reducing system;
iii) supplying the compressed fresh air to a gas separation system of the oxygen reducing system and separating at least a portion of oxygen contained in the fresh air in the gas separation system such that a nitrogen-enriched gas is provided at the outlet of the gas separation system;
iv) introducing the nitrogen-enriched gas provided at the outlet of the gas separation system into the enclosed room;
v) determining a pressure prevailing or set in the enclosed room in relation to an ambient air pressure to determine at least one differential pressure value;
vi) comparing the at least one differential pressure value determined in method step v) to a corresponding reference value;
vii) issuing an alarm when the comparison indicates that a difference between the at least one differential pressure value and the corresponding reference value is not within a preset tolerance range; and
viii) configuring the oxygen reducing system in a fire prevention/extinguishing mode when the comparison indicates that the difference between the at least one differential pressure value and the corresponding reference value is within the preset tolerance range.

2. The method according to claim 1, wherein the at least one pressure value determined in method step v) corresponds to a mean value of a plurality of pressures detected by a pressure measuring system.

3. The method according to claim 1, wherein a fresh air ventilator system of the oxygen reducing system and/or the compressor system of the oxygen reducing system introduces fresh air into the enclosed room in method step iv) additionally to the gas provided at the outlet of the gas separation system.

4. The method according to claim 3, wherein the gas introduced into the enclosed room in method step iv) is introduced continuously and at a constant flow rate, wherein a relative volumetric flow rate, which is a ratio of a volumetric flow rate and a product of room volume and air exchange rate, assumes a value between 0.2 and 0.9.

5. The method according to claim 1, wherein method step v) occurs concurrently or at least partially overlaps temporally with method step iv).

6. The method according claim 1, wherein the at least one pressure value determined in method step v) corresponds numerically to a differential pressure set in the enclosed room, relative to the ambient air pressure, upon a continuous supply of gas at a constant flow rate.

7. The method according to claim 6, wherein the at least one pressure value determined in method step v) is detected by means of a pressure measuring system.

8. The method according to claim 7, wherein the at least one pressure value determined in method step v) is detected at a point in time when temporal change in pressure in the enclosed room does not exceed a predefined or predefinable upper threshold at a continuous supply of gas at a constant volumetric flow rate and/or when a variance between a plurality of detected pressure values does not exceed a predefined or predefinable threshold.

9. The method according to claim 7, wherein a temperature in the enclosed room is measured continuously or at predefined times, and/or upon predefined events, and wherein the at least one pressure value detected by the pressure measuring system is determined in method step v) based on the measured temperature.

10. The method according to claim 1, wherein a total amount of gas introduced into the enclosed room per unit of time in method step iv) is detected continuously or at predefined times or upon predefined events by means of a volumetric flow measuring system.

11. The method according to claim 1, wherein the oxygen reducing system further comprises at least one controllably configured recirculation fan for a switchable and alternate supplying of ambient air from the enclosed room or fresh air, and wherein to realize method step iii), the at least one recirculation fan is controlled such that the fresh air is introduced into the enclosed room.

12. The method according to claim 1, wherein the oxygen reducing system further comprises a control unit, wherein the control unit is designed to set a nitrogen purity for the gas separation system to a predefined or predefinable value which is consistent with or higher than a concentration of a protected atmosphere during realizing of method step iii).

13. The method according to claim 7 wherein the pressure measuring system is a differential pressure measuring system.

14. The method according to claim 2 wherein the pressure measuring system is a differential pressure measuring system.

15. The method according to claim 9 wherein the pressure measuring system is a differential pressure measuring system.

16. An oxygen reducing system for setting and maintaining a predefinable oxygen content in a spatial atmosphere of an enclosed room which is reduced in comparison to normal ambient air, wherein the oxygen reducing system comprises the following:
  a compressor system for compressing an initial gas mixture containing at least nitrogen and oxygen;
  a gas separation system downstream of the compressor system for separating at least a portion of the oxygen contained in the initial gas mixture and for providing a nitrogen-enriched gas at the outlet of the gas separation system, wherein the outlet of the gas separation system is fluidly connected or connectable to the enclosed room; and
  a differential pressure measuring system for determining a set pressure within the enclosed room compared to the external pressure,
  wherein an alarm is issued when the set pressure value is not within a preset tolerance range of a reference value, and
  wherein the oxygen reducing system is configured in a fire prevention/extinguishing mode when the set pressure value is within the preset tolerance range of the reference value.

* * * * *